United States Patent
An (10) Patent No.: US 11,469,472 B2
(45) Date of Patent: Oct. 11, 2022

(54) BATTERY PACK HAVING WATERPROOF FUNCTION AND MANUFACTURING METHOD THEREFOR

(71) Applicant: LG CHEM, LTD., Seoul (KR)

(72) Inventor: Ji Myong An, Cheongju-Si (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 282 days.

(21) Appl. No.: 16/480,242

(22) PCT Filed: Aug. 24, 2018

(86) PCT No.: PCT/KR2018/009786
§ 371 (c)(1),
(2) Date: Jul. 23, 2019

(87) PCT Pub. No.: WO2019/045369
PCT Pub. Date: Mar. 7, 2019

(65) Prior Publication Data
US 2019/0372071 A1 Dec. 5, 2019

(30) Foreign Application Priority Data
Aug. 29, 2017 (KR) .................. 10-2017-0109544

(51) Int. Cl.
*H01M 50/24* (2021.01)
*H01M 10/42* (2006.01)
(Continued)

(52) U.S. Cl.
CPC ......... *H01M 50/24* (2021.01); *H01M 10/425* (2013.01); *H01M 50/20* (2021.01);
(Continued)

(58) Field of Classification Search
None
See application file for complete search history.

(56) References Cited

U.S. PATENT DOCUMENTS

| | | |
|---|---|---|
| 2012/0301758 A1 | 11/2012 | Lu |
| 2014/0134464 A1 | 5/2014 | Jang et al. |

(Continued)

FOREIGN PATENT DOCUMENTS

| | | |
|---|---|---|
| CN | 204067449 U | 12/2014 |
| CN | 204792929 U | 11/2015 |

(Continued)

OTHER PUBLICATIONS

JP2014049427A—Machine Translation (Year: 2014).*

(Continued)

*Primary Examiner* — Brian R Ohara
*Assistant Examiner* — Patrick Marshall Greene
(74) *Attorney, Agent, or Firm* — Birch, Stewart, Kolasch & Birch, LLP (57) ABSTRACT

A battery pack having a battery module having a module case to fix an entire outer periphery of a plurality of battery cells, an upper stage pack cover positioned on an uppermost stage of the battery module and having a pair of terminal penetration holes formed therein, and a lower stage pack cover positioned under the battery module to surround a lower stage portion of the battery module. The battery module is provided with a pair of electrode terminals at a position corresponding to the terminal penetration holes of the upper stage pack cover. Each electrode terminal of the pair of electrode terminals pass through a corresponding terminal penetration hole of the pair of terminal penetration holes and are exposed to the outside. A method for manufacturing the same is also provided.

9 Claims, 6 Drawing Sheets

(51) Int. Cl.
*H01M 50/20* (2021.01)
*H01M 50/543* (2021.01)

(52) U.S. Cl.
CPC .. *H01M 50/543* (2021.01); *H01M 2010/4271* (2013.01); *H01M 2220/20* (2013.01)

(56) References Cited

U.S. PATENT DOCUMENTS

| | | | |
|---|---|---|---|
| 2015/0111083 A1* | 4/2015 | Kim | H01M 50/26 429/120 |
| 2015/0295211 A1 | 10/2015 | Kim et al. | |
| 2017/0125752 A1 | 5/2017 | Kim et al. | |
| 2017/0194681 A1 | 7/2017 | Kim et al. | |
| 2018/0034012 A1 | 2/2018 | Yu et al. | |

FOREIGN PATENT DOCUMENTS

| | | | |
|---|---|---|---|
| CN | 105431962 A | | 3/2016 |
| EP | 3 010 072 A1 | | 4/2016 |
| JP | 2011049014 A | * | 3/2011 |
| JP | 2011-154882 A | | 8/2011 |
| JP | 2013-120675 A | | 6/2013 |
| JP | 2013-229182 A | | 11/2013 |
| JP | 2013-239322 A | | 11/2013 |
| JP | 2014-49427 A | | 3/2014 |
| JP | 2014049427 A | * | 3/2014 |
| JP | 2014-116238 A | | 6/2014 |
| JP | 2016-504732 A | | 2/2016 |
| JP | 2016-31915 A | | 3/2016 |
| JP | 2016-33908 A | | 3/2016 |
| KR | 10-2012-0122007 A | | 11/2012 |
| KR | 10-2012-0128660 A | | 11/2012 |
| KR | 10-2015-0117936 A | | 10/2015 |
| KR | 10-2015-0137262 A | | 12/2015 |
| KR | 10-2015-0137993 A | | 12/2015 |
| KR | 10-2017-0010666 A | | 2/2017 |
| KR | 10-2017-0019041 A | | 2/2017 |
| KR | 10-2017-0075484 A | | 7/2017 |
| WO | WO 2015/029619 A1 | | 3/2015 |

OTHER PUBLICATIONS

JP2014049427A—Machined Translation (Year: 2014).*
JP2016031915A—Machine Translation (Year: 2016).*
JP2011049014A—Machine Translation (Year: 2011).*
International Search Report for PCT/KR2018/009786 (PCT/ISA/210) dated Nov. 28, 2018, with English translation.
Extended European Search Report dated Mar. 13, 2020 in European Applicaiton No. 18851063.0.

* cited by examiner

BATTERY PACK HAVING WATERPROOF FUNCTION AND MANUFACTURING METHOD THEREFOR

TECHNICAL FIELD

The present invention relates to a battery pack having waterproof function and manufacturing method therefor, and more particularly, to battery pack which prevents water penetration from the outside, is provided with a stable electrode terminal fastening structure, and thereby has a waterproof function that firmly retain fastening even when a vibration is generated, and a manufacturing method therefor.

BACKGROUND ART

The lithium secondary battery, as a unit cell constituting a battery pack, has flexibility, a relatively free shape, a small weight, and excellent safety, and thus has increasing demand as a medium-sized battery pack such as a starter battery for automobiles, construction heavy equipment, and the like.

In addition, the shape of the battery pack is classified according to the shape of battery case. When an electrode assembly is embedded in a cylindrical or prismatic metal can, the battery pack is classified into cylindrical batteries and prismatic battery pack. In addition, when the electrode assembly is embedded in a pouch-type case formed of an aluminum laminate sheet, the battery pack is classified into a pouch-type battery pack.

In addition, the electrode assembly embedded in a battery case is provided in a structure including a positive electrode, a negative electrode, and a separator inserted between the positive electrode and the negative electrode, and can thereby be charged/discharged. In addition, the shape of the cylindrical electrode assembly is formed in a jelly-roll type in which a positive electrode, a separator, and a negative electrode, which have long sheet-like shapes and are coated with an electrode active material, are sequentially laminated and wound.

Meanwhile, the battery pack has a danger in that when water such as rain water penetrates into the battery pack, a secondary battery is damaged and an electric shock occurs.

In order to prevent such problems, a battery pack having waterproof function is provided, and a battery pack equipped with a conventional waterproof structure will be described with reference to FIG. 1.

Figure 1:
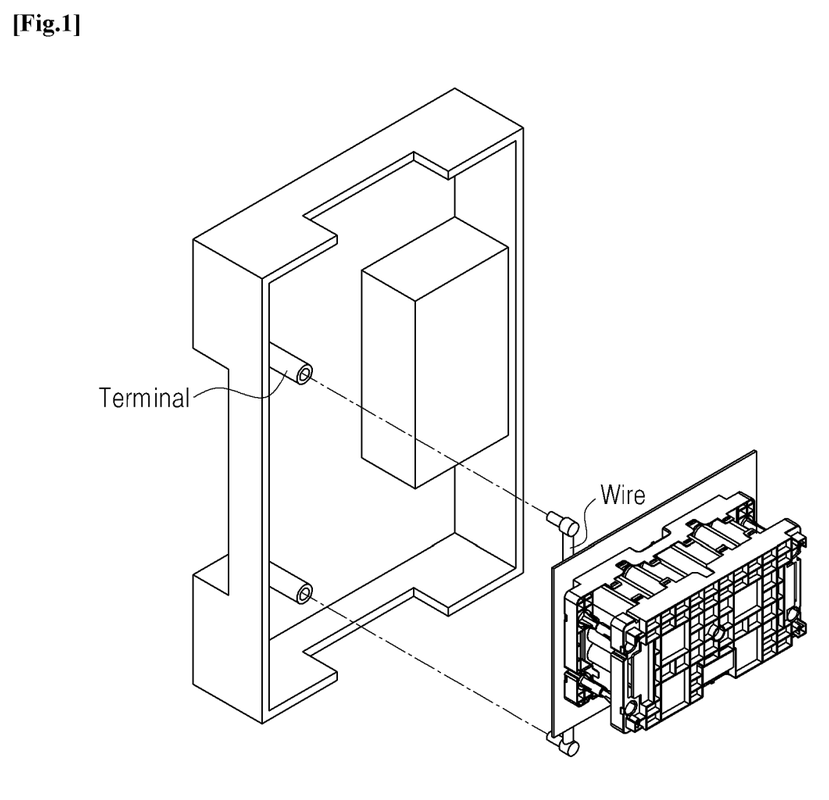
FIG. 1 is a structural view of a battery pack equipped with a conventional waterproof structure.

FIG. 1 is a structural view of a battery pack equipped with a conventional waterproof structure.

Referring to FIG. 1, in a battery pack equipped with a conventional waterproof structure, connection between a battery module and an electrode terminal exposed to the outside to supply power is fastened by means of a wire.

However, a thick wire (AWG 8 or less) is used as the wire due to a high output of the battery pack. Accordingly, a tension is generated in the wire and there is a problem in that the fastening of the electrode terminal in an upper case and the wire is difficult. In addition, after the electrode terminal and the wire of the battery module are coupled, the upper case to which the wire is coupled is overturned and positioned inside a lower case, and thus, a cumbersome battery pack assembly process is performed.

In addition, since the wire is not fixed in the connection between the wire and the electrode terminal, when vibrations occur or when testing a mechanism, there is a problem in that the connection between the electrode terminal and the wire is disconnected.

Thus, it is demanded to develop a technique such that an assembly process of the battery pack is not difficult, and the connection between the battery module and the electrode terminal is firmly fastened.

RELATED ART DOCUMENT

Patent Document (Patent document 1) KR2017-0019041 A

DISCLOSURE OF THE INVENTION

Technical Problem

The present invention provides a battery pack having waterproof function which can be easily assembled and has a firm connection between an electrode terminal and a battery module, and a manufacturing method therefor.

Technical Solution

In accordance with an exemplary embodiment, a battery pack includes: a battery module having a module case to surround and fix an entire outer periphery of a plurality of battery cells; an upper stage pack cover positioned on an uppermost stage of the battery module and having a pair of terminal penetration holes formed therein; and a lower stage pack cover positioned under the battery module to surround a lower stage portion of the battery module, wherein the battery module is provided with a pair of electrode terminals at a position corresponding to the terminal penetration holes of the upper stage pack cover, and each electrode terminal of the pair of electrode terminals pass passes through a corresponding terminal penetration hole of the pair of terminal penetration holes and is exposed to the outside.

The module case of the battery module may include: a waterproof cover which is located under the upper stage pack cover and is formed in a waterproof structure; an upper cell cover located under the water proof cover and over the plurality of battery cells to fix an upper portion of the plurality of battery cells; a side surface cell cover located under the upper cell cover to surround and fix side surfaces of all of the plurality of battery cells; and a lower cell cover located under the side surface cell cover to fix a lower portion of all of the plurality of battery cells.

The upper cell cover may be provided with a battery management system (BMS) on an upper surface therefor, and the BMS may be provided with two pairs of BMS connection parts, each pair of BMS connection parts being electrically connected to a corresponding electrode terminal of the pair of electrode terminals.

The waterproof cover may include: the pair of electrode terminals, each electrode terminal being provided with a terminal-connecting tab, each terminal-connecting tab having a through hole at a position corresponding to one of the BMS connection parts of the upper cell cover so that a connection member is connected therethrough to the one of the BMS connection parts, and each electrode terminal is provided with a terminal protrusion part exposed to the outside to supply power on a central portion thereof; a pair of electrode columns which are respectively located under the pair of electrode terminals, protrude a predetermined height so that the electrode terminals are exposed to the outside, and have central portions each formed in a shape corresponding to an inside of a corresponding terminal protrusion part; and penetration parts which are respectively located on opposite sides of each electrode column of the pair of electrode columns and have through holes at positions corresponding to the through holes of the pair of electrode terminals.

Waterproof members may be coated or attached to outer peripheries of the electrode columns and the electrode terminals.

The waterproof cover may be provided with a separation wall installed at outer peripheries of each of the terminal-connecting tabs of the electrode terminals.

The upper stage pack cover and the lower stage pack cover may be coupled to each other with a waterproof member interposed therebetween.

The lower stage pack may include a coupling part at an upper part of the lower stage pack. The waterproof member may be attached or coated on an upper surface of the coupling part so as to be arranged between the upper stage cover and the lower stage cover.

In accordance with another exemplary embodiment, a method for manufacturing a battery pack includes: a pack cover preparing step for preparing a lower stage pack cover and an upper stage pack cover of a battery pack; a lower pack forming step for assembling a battery module to position the battery module on the lower stage pack cover; an electrode terminal coupling step for coupling a BMS of the battery module assembled in the lower pack forming step and an electrode terminal which is exposed to outside the battery module and supplies power; and an upper stage pack cover assembling step in which a cover waterproofing member is provided to a lower stage pack coupling part of the lower stage pack cover, and an upper stage pack coupling part of the upper stage pack cover is assembled so as to be joined to the lower stage pack coupling part with the cover waterproofing member therebetween.

Prior to the electrode terminal coupling step, a waterproof member may be attached or coated on an upper end of the battery module to be in contact with the electrode terminal.

After the electrode coupling step, a waterproof member may be attached or coated on the electrode terminal.

Advantageous Effects

A battery pack having waterproof function and manufacturing method therefor in accordance with exemplary embodiments does not need a precise assembly process and thus have a more effective waterproof structure, and the connection between electrode terminals and a battery module is firmly fastened to make it possible to more stably operate the battery pack.

MODE FOR CARRYING OUT THE INVENTION

Hereinafter, embodiments of the present invention will be described in detail with reference to the accompanying drawings. However, the present invention is not restricted or limited by the exemplary embodiments. Rather, these embodiments are provided so that this disclosure will be thorough and complete, and will fully convey the scope of the inventive concept to those skilled in the art.

Although the terms such as "first" and "second" are used herein to describe various elements, these elements should not be limited by these terms. These terms are only used to distinguish one element from other elements. For example, a first element could be termed a second element, and similarly, a second element could be termed a first element, without departing from the scope of the present invention. In the following description, the terms are used only for explaining a specific exemplary embodiment while not limiting the present invention. The singular forms are intended to include the plural forms as well, unless the context clearly indicates otherwise.

The terms used in the present invention are selected from the general terms that are widely used at present if possible and in consideration of the functions in the present invention, but the terms may be changed depending on the intent of a person skilled in the art or the precedents, or by the emergence of new technologies, etc. Further, certain terms may be arbitrarily chosen, in which case the corresponding meaning will be described in detail in the present invention. Accordingly, the terms used in the present invention should be defined not simply on the basis of the names of the terms, but on the basis of the meanings of the terms and the context throughout the description.

Embodiment 1

Next, a battery pack having waterproof function in accordance with an exemplary embodiment will be described.

Figure 2:
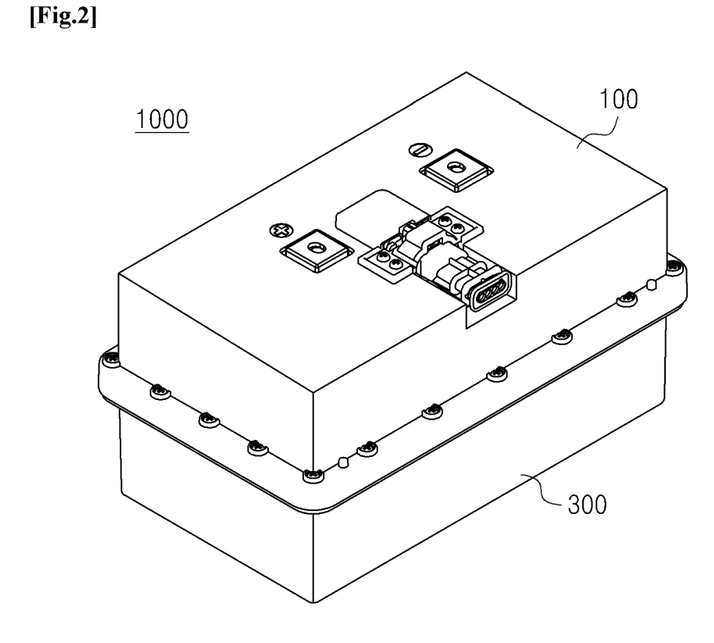
FIG. 2 is a structural view of a battery pack having waterproof function in accordance with an exemplary embodiment.

FIG. 2 is a structural view of a battery pack having waterproof function in accordance with an exemplary embodiment.

Figure 3:
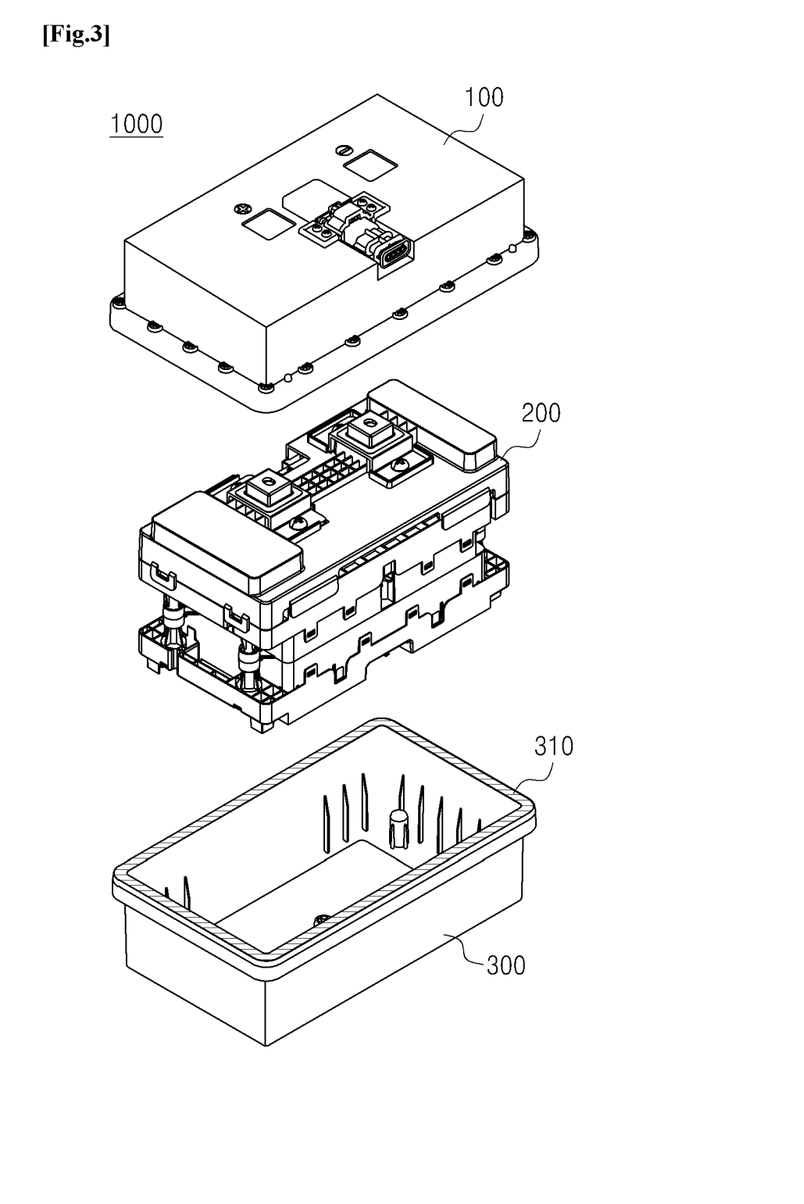
FIG. 3 is a perspective view of a battery pack having waterproof function in accordance with an exemplary embodiment.

FIG. 3 is a perspective view of a battery pack having waterproof function in accordance with an exemplary embodiment.

Referring to FIGS. 2 and 3, a battery pack 1000 in accordance with an exemplary embodiment includes: an upper stage pack cover 100 positioned on the uppermost stage of the battery pack and having a terminal penetration hole formed therein so that electrode terminals may be exposed to the outside; a battery module 200 provided with a module case positioned under the upper stage pack cover 100 to surround and fix the entire outer periphery of a plurality of battery cells; and a lower stage pack cover 300 positioned under the battery module 200 to surround a lower stage portion of the battery module.

The configurations of the battery pack 1000 will be described below in more detail.

The upper stage pack cover 100 is a component which is positioned on the uppermost stage of the battery pack and in which a terminal penetration hole is provided so that electrode terminals may be exposed to the outside, and the lower stage pack cover 300 is a component which is positioned under the battery module 200 to surround the lower stage portion of the battery module. In addition, the upper stage pack cover 100 is formed in a shape such that the upper stage pack cover 100 and the lower stage pack cover 300 can be coupled to each other. Here, as a couplable shape, in an embodiment, penetration holes for screw coupling are provided in the upper stage pack cover 100 and in the lower stage pack cover 300, but embodiments are not limited thereto.

In addition, the lower stage pack cover 300 has a lower stage pack coupling part 310 on a portion at which the lower stage pack cover 300 and the upper stage pack cover 100 contact each other, and a waterproof material is attached or coated to the upper surface of or inside the lower stage pack coupling part 310, whereby water penetration from the coupling part is prevented.

Meanwhile, the battery module 200 will be described in more detail with reference to FIG. 4.

Figure 4:
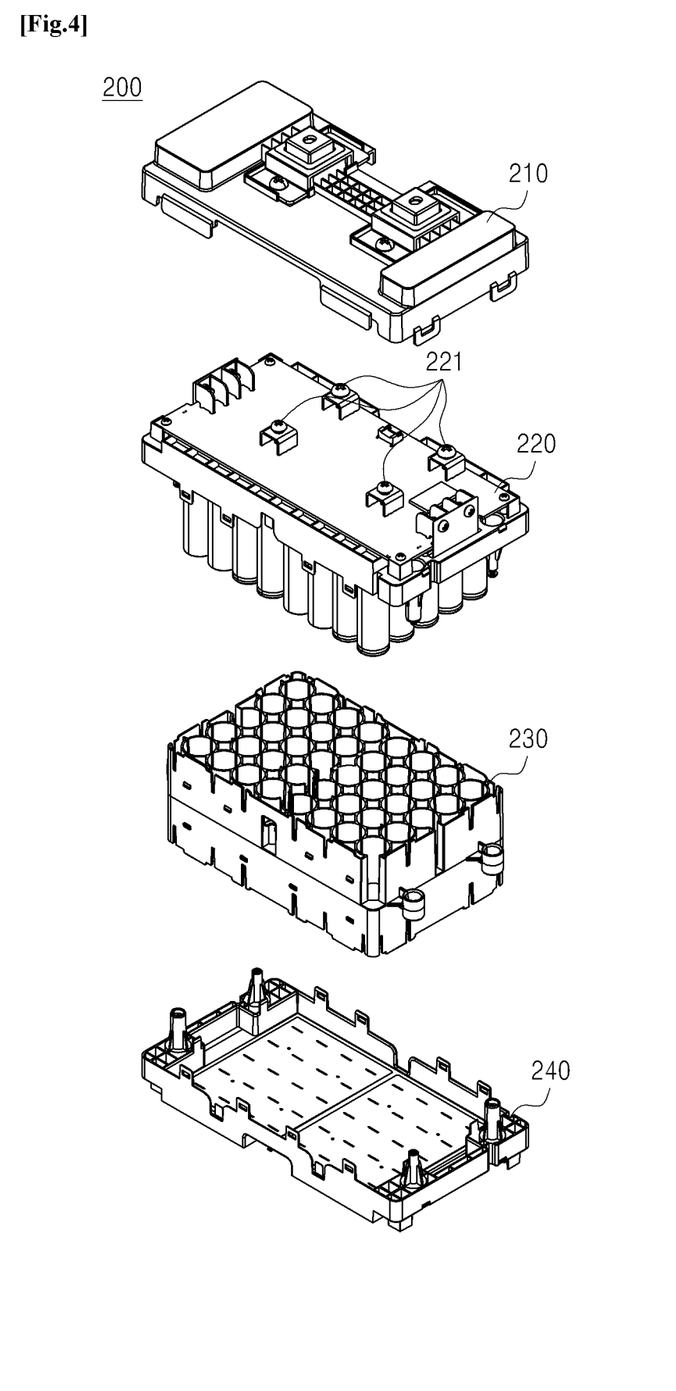
FIG. 4 is a perspective view of a battery module in a battery pack having waterproof function in accordance with an exemplary embodiment.

FIG. 4 is a perspective view of a battery module in a battery pack having waterproof function in accordance with an exemplary embodiment.

Referring to FIG. 4, the battery module 200 is a component provided with a module case which is located under the upper stage pack cover 100 to surround and fix the entire outer periphery of the plurality of battery cells, and makes the battery cells into a unit module.

More specifically, the battery module 200 is configured to include the battery cells and the module case that surrounds the battery cells, and the module case is configured to include: a waterproof cover 210 which is located under the upper stage pack cover 100 and is formed in a waterproof structure for preventing water penetration into the battery module; an upper cell cover 220 located under the waterproof cover 210 and over the plurality of battery cells to fix the upper portions of the plurality of battery cells; a side surface cell cover 230 located under the upper cell cover 220 to surround and fix the side surfaces of the plurality of battery cells; and a lower cell cover 240 located under the side cell cover 230 to fix the lower portions of all of the plurality of battery cells.

In addition, the upper cell cover 220 is provided with a battery management system (hereinafter referred to as a "BMS") located on the upper surface therefor, and the BMS is provided with two pairs of BMS connection parts 221 which can be electrically connected to an electrode terminal 211. Thus, it is possible to supply power from the plurality of battery cells, or to perform a control such that a voltage is charged from an external power source to the battery cells.

In addition, the BMS performs various control functions, such as, measurement of electrical characteristic values including a charge/discharge current, and the voltage or current of each of the secondary battery cells, voltage equalization control, and estimation of the state of charge (SOC). The upper cell cover 220, the side surface cell cover 230, and the lower cell cover 240 form the module case of the battery module, and the waterproof cover 210 is further provided thereon, whereby water penetration into the battery module can be doubly prevented and the upper surface of the BMS is also protected.

In addition, the waterproof cover 210 is a component located under the upper stage pack cover 100 and is formed in a waterproof structure that prevents water penetration into the battery module, and will be described in more detail with reference to FIG. 5.

Figure 5:
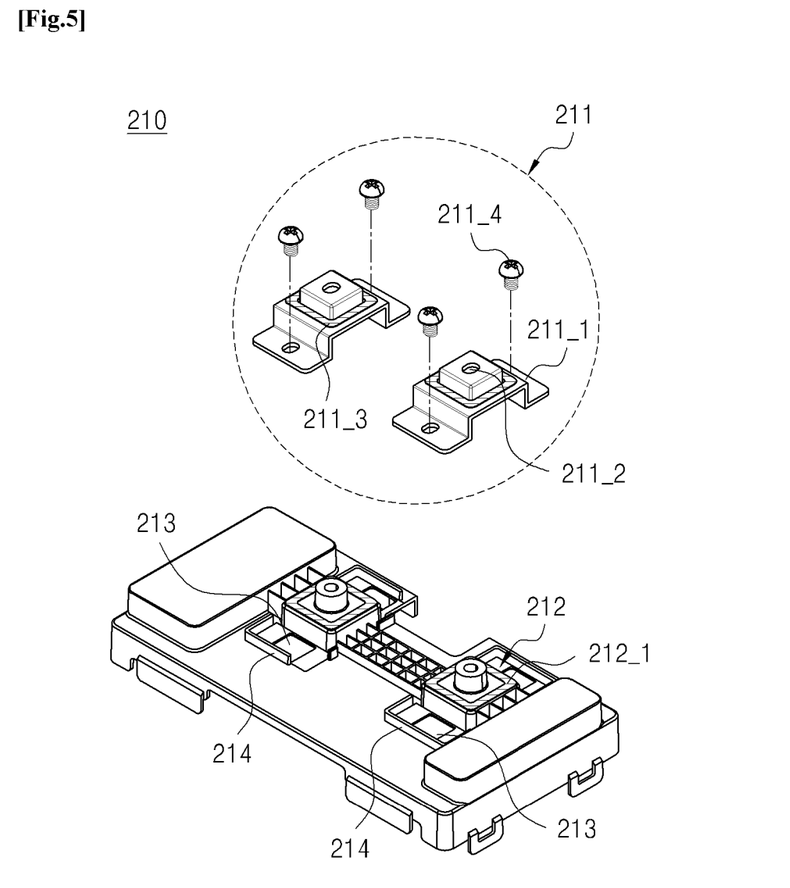
FIG. 5 is an enlarged view of a waterproof cover in a battery pack having waterproof function in accordance with an exemplary embodiment.

FIG. 5 is an enlarged view of a waterproof cover in a battery pack having waterproof function in accordance with an exemplary embodiment.

Referring to FIG. 5, the waterproof cover 210 is configured to include: a pair of electrode terminals 211 each provided with a terminal-connecting tab 211_1, having a through hole at a position corresponding to the BMS connection part 221 of the upper cell cover 220, and on a central portion of the electrode terminal, a terminal protrusion part 2112 exposed to the outside to supply power; a pair of electrode columns 212 which are located under the pair of electrode terminals 211, protrude a predetermined height so that the electrode terminals are exposed to the outside, and have central portions each formed in a shape corresponding to the inside of the terminal protrusion part 211_2 of the electrode terminal 211; and penetration parts 213 which are located on both sides of the pair of electrode columns 212 and have through holes at positions corresponding to the through holes of the pair of electrode terminals.

In addition, the waterproof cover 210 is provided with coupling tabs, which can be coupled to the upper cell cover 220, on lower side ends of four surfaces, and is thereby allowed to be firmly coupled to the upper cell cover 220.

In addition, the electrode terminals 211 are components which pass through the terminal through holes of the upper stage pack cover 100 to supply power to the outside. In addition, since the outer peripheral portion of each terminal protrusion part 2112 formed on the central portion of each electrode terminal 211 contacts the upper stage pack cover 100, a waterproof member 211_3 is attached or coated on the contact portion to prevent water penetration from the outside.

In addition, the terminal-connecting tabs 211_1 are provided with through holes in side surfaces of the terminal protrusion parts 2112, and the terminal-connecting tabs 211_1 are formed at positions corresponding to the BMS connection parts 221 of the upper cell cover 220 and allow electrical connection with the BMS to be achieved.

In addition, connection members 211_4 which can be electrically connected to the BMS are connected to the through holes of the terminal-connecting tabs 211_1. The connection members 211_4 may be provided as bolts in an embodiment, but embodiments are not limited thereto.

In addition, the terminal-connecting tabs 211_1 are bent by a predetermined height so that the central portions of the electrode columns 212 which protrude a predetermined height can be coupled into the terminal protrusion parts 211_2.

In addition, on the outsides of the terminal-connecting tabs 211_1, separation walls 214 are respectively disposed, such that the electrode terminals 211 can be coupled to the regular position when assembling the electrode terminals 211. Accordingly, the battery pack which can be assembled only by manual assembly is allowed to also be automatically assembled.

In addition, the electrode terminal 211 may be formed of copper, a copper-nickel alloy, or copper-chrome alloy, etc. having excellent electrical conductivity and durability.

In addition, the pair of electrode columns 212 are respectively located under the pair of electrode terminals 211 and protrude by a predetermined height so that the electrode terminals are exposed to the outside, and the central portions of the electrode columns are formed in shapes corresponding to the terminal protrusion parts 211_2. In addition, waterproof members 212_1 are attached or coated on the outer peripheral portions of the electrode columns 212 contacting the terminal protrusion parts 211_2 provided on the central portions of the electrode terminals 211 are allowed to be prevented from water penetration from the outside by attaching or coating the waterproof members 212_1 on the outer peripheral portions.

In addition, the penetration parts 213 are respectively positioned on both sides of the pair of electrode columns 212, and the through holes of the waterproof cover are provided at positions corresponding to the through holes of the pair of electrode terminals. In addition, the BMS connection parts 221 of the upper cell cover 220 are positioned under the penetration parts 213, and when the connection members 211_4 are fastened from the terminal-connecting tabs 211_1, the electrode terminals 211 and the BMS are electrically connected. Accordingly, since the electrode terminals 211 are exposed to the outside, the separate waterproof cover is provided to portions except for the portions connected to the BMS and allows the BMS to be protected.

In addition, the upper cell cover 220 is a component which is located under the waterproof cover 210 and over the plurality of battery cells to fix the plurality of batteries. In addition, since the BMS is provided in the upper stage, a BMS fixing member for positioning the BMS is further provided, and the BMS connection parts 221 electrically connected to the electrode terminals 211 is located over the BMS and is provided with a hole so as to be connected to the connection members 211_4 of the electrode terminals 211. Here, the insides of the holes of the BMS connection parts 221 may be formed as nuts in an embodiment so as to be connected to the connection members 2114 of the electrode terminals 211, but embodiments are not limited thereto. In addition, the connection terminal is formed of a conductive material receiving a large power and allows the power of the battery module to be transmitted to the electrode terminals 211.

In addition, the upper cell cover 220 is provided with a coupling member having a shape corresponding to the coupling tabs on positions of the coupling tabs of the waterproof cover 210 so as to be coupled to the waterproof cover 210.

In addition, the side surface cell cover 230 is a component located under the upper cell cover 220 to surround and fix the entire side surfaces of the plurality of battery cells, and the lower cell cover 240 is a component located under the side surface cell cover to fix the lower portions of the plurality of battery cells. In addition, coupling structures which can be coupled to the upper cell cover 220 and the lower cell cover 240 are provided on transverse side surfaces of the side surface cell cover 230.

In addition, coupling structures which can be coupled to each other are provided also on the transverse side surfaces of the upper cell cover 220 and the lower cell cover 240.

Accordingly, the plurality of battery cells are firmly fixed, and thus, even under continuous vibrations or slight shocks, the battery cells are not detached and allow the battery to be stably operated.

Embodiment 2

Next, a manufacturing method of a battery pack having waterproof function in accordance with an exemplary embodiment will be described.

In a manufacturing method of a battery pack having waterproof in accordance with an exemplary embodiment, terminal electrodes are coupled to a battery module provided with a waterproof cover, and a water proof member is attached or coated on a region contacting the upper end of the battery module and an upper stage pack case, whereby water penetration from the outside is prevented, and the battery pack is allowed to be easily assembled.

Figure 6:
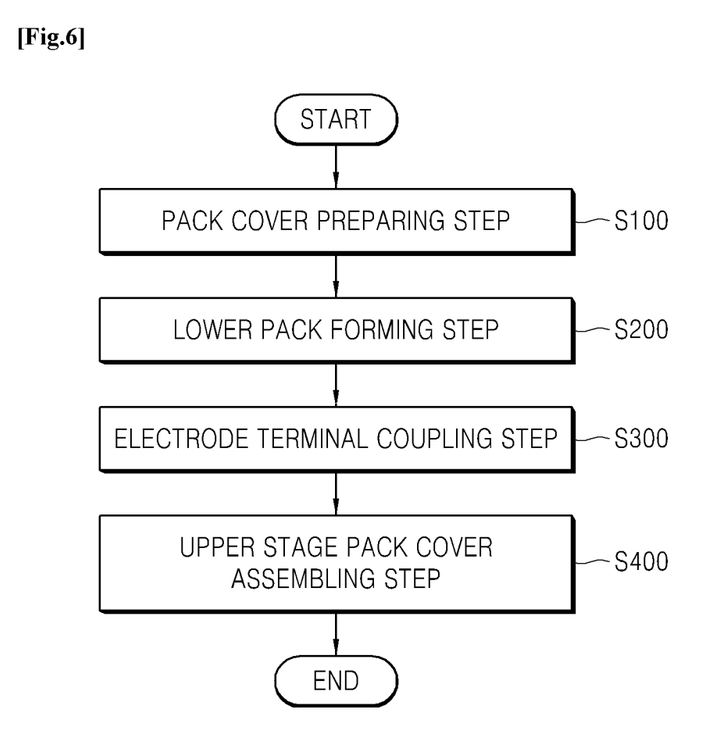
FIG. 6 is a flowchart of a manufacturing method of a battery pack having waterproof function in accordance with an exemplary embodiment.

FIG. 6 is a flowchart of a manufacturing method of a battery pack having waterproof function in accordance with an exemplary embodiment.

Referring to FIG. 6, in a method for manufacturing a battery pack in accordance with an exemplary embodiment, a lower stage pack cover and an upper stage pack cover of a battery pack are prepared (pack cover preparing step S100) and a battery module is assembled and the battery module is positioned on the lower stage pack cover (lower pack forming step S200).

Next, a BMS of the assembled battery module and an electrode terminal which is exposed to the outside and supplies power are coupled (electrode terminal coupling step S300), a cover waterproofing member is provided to a lower stage pack coupling part of the lower stage pack cover, and the upper stage pack coupling part of the upper stage pack cover are assembled so as to be joined to a lower stage pack coupling part with the cover waterproofing member therebetween (upper stage pack cover assembling step S400).

In addition, each of steps of the method for manufacturing a battery pack will be described in more detail below.

The pack cover preparing step S100 is a step for preparing a lower stage pack cover and an upper stage pack cover, and coupling parts which are formed through injection molding and can be connected to each other are provided on the lowermost portion of the upper stage pack cover and the uppermost portion of the lower stage pack cover.

In addition, the lower pack forming step S200 is a step for assembling a battery module and positioning the battery module on the lower stage pack cover, and firstly, the battery module is assembled. The battery module is assembled such that a plurality of battery cells are accommodated inside a side surface cell cover 230, a metal panel for electrical connection is joined on upper and lower portion of the battery cells, and then a lower cell cover 240 and an upper cell cover 220 are coupled.

Subsequently, a BMS provided with BMS connection parts 221 which electrically connect the plurality of battery cells is mounted on an upper surface of the upper cell cover 220, and a waterproof cover 210 which has been injection molded is coupled to an upper portion, of the upper cell cover, on which the BMS has been mounted, whereby the assembly of the battery module is completed.

The battery module assembled as described above is positioned on the lower stage pack cover and the lower stage pack may thereby be configured.

In addition, the electrode coupling step S300 is a step for coupling the BMS of the battery module assembled in the lower pack forming step S200 and electrode terminals which are exposed to the outside and supply power. More specifically, the electrode terminals 211 which are exposed to the outside to supply or receive power are electrically connected to the BMS connection parts 221, whereby a power path to the plurality of battery cells is formed.

In addition, prior to the electrode coupling step, a waterproof member is attached or coated on an upper stage of the battery module to which the electrode terminals contact, and after the electrode coupling step, a waterproof member is attached or coated on the electrode terminals and allows the water penetration from the outside to be prevented.

In addition, the upper stage pack cover assembly step S400 is a step for providing and assembling a cover waterproofing member to a lower stage pack coupling part of the lower stage pack cover so that the upper stage pack coupling part of the upper stage pack cover is joined to the lower stage pack coupling part of the lower stage pack cover with the cover waterproofing member therebetween, wherein according to the shape of the lower stage pack coupling part, the waterproof member is attached or coated to the inside or the upper surface of the coupling part.

Meanwhile, the technical idea of the present invention has been specifically described with respect to the above embodiments, but it should be noted that the foregoing embodiments are provided only for illustration while not limiting the present invention. In addition, a person with an ordinary skill in the technical field belonging to the present invention may carry out various embodiments within the scope of claims set forth herein.

DESCRIPTION OF SYMBOLS

1000: Battery Pack
100: Upper Stage Pack Cover
200: Battery Module
210: Waterproof Cover
211: Electrode Terminal
211_1: Terminal-Connecting Tab
211_2: Terminal Protrusion Part
211_3: (Terminal) Waterproof Member
211_4: Connection Member
212: Electrode Column
212_1: (Electrode Column) Waterproof Member
213: Penetration Part
214: Separation Wall
220: Upper Cell Cover
221: Bms Connection Part
230: Side Surface Cell Cover
240: Lower Cell Cover
300: Lower Stage Pack Cover
310: Lower Stage Pack Coupling Part

What is claimed is:

1. A battery pack, comprising:
    a battery module having a module case to surround and fix an entire outer periphery of a plurality of battery cells;
    an upper stage pack cover positioned on an uppermost stage of the battery module and having a pair of terminal penetration holes formed therein; and
    a lower stage pack cover positioned under the battery module to surround a lower stage portion of the battery module, wherein
    the battery module is provided with a pair of electrode terminals at a position corresponding to the terminal penetration holes of the upper stage pack cover, and
    each electrode terminal of the pair of electrode terminals passes through a corresponding terminal penetration hole of the pair of terminal penetration holes and is exposed to the outside,
    wherein the module case of the battery module comprises:
        a waterproof cover which is located under the upper stage pack cover and is formed in a waterproof structure for preventing water penetration into the battery module;
        an upper cell cover located under the waterproof cover and over the plurality of battery cells to fix an upper portion of the plurality of battery cells;
        a side surface cell cover located under the upper cell cover to surround and fix side surfaces of all of the plurality of battery cells; and
        a lower cell cover located under the side surface cell cover to fix a lower portion of all of the plurality of battery cells,
    wherein the waterproof cover, the upper cell cover, the side surface cell cover, and the lower cell cover are separate members,
    wherein the upper cell cover is provided with a battery management system (BMS) on an upper surface thereof, and the BMS is provided with two pairs of BMS connection parts, each pair of BMS connection parts of the two pairs of BMS connection parts being electrically connected to a corresponding electrode terminal of the pair of electrode terminals, and
    wherein the waterproof cover comprises:
        the pair of electrode terminals, each electrode terminal being provided with a terminal-connecting tab, each terminal-connecting tab having a through hole at a position corresponding to one of the BMS connection parts of the upper cell cover so that a connection member is connected therethrough to the one of the BMS connection parts, and each electrode terminal is provided with a terminal protrusion part exposed to the outside to supply power on a central portion thereof;
        a pair of electrode columns which are respectively located under the pair of electrode terminals and between BMS connection parts of each corresponding pair of BMS connection parts, protrude a predetermined height so that the electrode terminals are exposed to the outside, and have central portions each formed in a shape corresponding to an inside of a corresponding terminal protrusion part; and
        penetration parts which are respectively located on opposite sides of each electrode column of the pair of electrode columns and have through holes at positions corresponding to the through holes of the pair of electrode terminals.

2. The battery pack of claim 1, wherein waterproof members are coated or attached to outer peripheries of the electrode columns and the electrode terminals.

3. The battery pack of claim 1, wherein the waterproof cover is provided with a separation wall installed at outer peripheries of each of the terminal-connecting tabs of the electrode terminals.

4. The battery pack of claim 1, wherein the upper stage pack cover and the lower stage pack cover are coupled to each other with a waterproof member interposed therebetween.

5. The battery pack according to claim 4, wherein
    the lower stage pack includes a coupling part at an upper part of the lower stage pack, and
    the waterproof member is attached or coated on an uppermost surface of the coupling part so as to be arranged between the upper stage cover and the lower stage cover.

6. The battery pack according to claim 4, wherein the electrode terminals extend directly from the waterproof cover through the terminal penetration holes.

7. The battery pack according to claim 1, wherein the waterproof cover surrounds an outermost perimeter of the upper cell cover.

8. The battery pack according to claim 1, wherein the side surface cell cover extends between all battery cells of the battery module.

9. The battery pack according to claim 1, wherein the upper cell cover is disposed above the tops of the plurality of battery cells.

* * * * *